United States Patent
Shirakawa et al.

(10) Patent No.: US 11,190,119 B2
(45) Date of Patent: Nov. 30, 2021

(54) CONTROL DEVICE AND WIRE CONNECTION DETERMINATION METHOD

(71) Applicant: FANUC CORPORATION, Minamitsuru-gun (JP)

(72) Inventors: Yuuki Shirakawa, Yamanashi-ken (JP); Satoshi Ikai, Yamanashi-ken (JP); Wei Luo, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/881,914

(22) Filed: May 22, 2020

(65) Prior Publication Data

US 2020/0382027 A1  Dec. 3, 2020

(30) Foreign Application Priority Data

May 28, 2019 (JP) .............................. JP2019-099146

(51) Int. Cl.
*H02P 7/285* (2016.01)
*G05D 3/14* (2006.01)

(52) U.S. Cl.
CPC ........... *H02P 7/285* (2013.01); *G05D 3/1427* (2013.01)

(58) Field of Classification Search
CPC ........ H02P 7/285; H02P 29/028; H02P 29/60; H02P 1/00; H02P 1/04; H02P 1/16; H02P 1/163; H02P 1/18; H02P 1/26; H02P 1/42; H02P 1/54; H02P 1/46; H02P 3/00; H02P 5/00; H02P 5/68; H02P 5/74; H02P 6/00; H02P 6/04; H02P 6/12; H02P 6/14; H02P 6/16; H02P 6/26; H02P 6/32; H02P 27/00; H02P 27/04; H02P 27/06; H02P 9/007; H02P 21/00; H02P 23/07; B62D 5/0487; G01R 15/181; G01R 31/08; H02H 3/162; H02H 3/16; H02H 7/26; H02H 7/261; H02H 3/28; H02H 3/042; H02H 3/04; H02H 7/00; H02H 7/226; H02H 7/228

See application file for complete search history.

(56) References Cited

U.S. PATENT DOCUMENTS 6,757,583 B2 * 6/2004 Giamona ........... G05B 19/4141
318/572

FOREIGN PATENT DOCUMENTS

| JP | 2007-089243 A | 4/2007 | |
| JP | 2016-001945 A | 1/2016 | |
| JP | 2016001945 A | * 1/2016 | .............. H02P 27/06 |

* cited by examiner

*Primary Examiner* — Antony M Paul

(74) *Attorney, Agent, or Firm* — McGinn IP Law Group, PLLC

(57) ABSTRACT

A control device includes: an output unit configured to select a motor and output a drive command to a motor drive unit that should be connected to the selected motor so that the selected motor executes a predetermined feed operation; an acquisition unit configured to acquire feedback information from each of the multiple motor drive units; and a wire connection determination unit configured to determine, based on the feedback information, whether the selected motor is connected to the motor drive unit that should be connected to the selected motor, by a power line and a feedback line.

13 Claims, 8 Drawing Sheets

CONTROL DEVICE AND WIRE CONNECTION DETERMINATION METHOD

CROSS-REFERENCE TO RELATED APPLICATION

This application is based upon and claims the benefit of priority from Japanese Patent Application No. 2019-099146 filed on May 28, 2019, the contents of which are incorporated herein by reference.

BACKGROUND OF THE INVENTION

Field of the Invention

The present invention relates to a control device and a wire connection determination method which facilitate detection of erroneous wire connection when a plurality of motors and a plurality of motor drive units are connected using multiple power lines and multiple feedback lines.

Description of the Related Art

Japanese Laid-Open Patent Publication No. 2016-001945 discloses a motor and a motor control device connected thereto. The motor control device in this disclosure is configured to perform feedback control on the motor connected thereto.

SUMMARY OF THE INVENTION

As disclosed in Japanese Laid-Open Patent Publication No. 2016-001945, in general, the connection relationship between the power line and the feedback lines is specified beforehand. That is, a motor drive unit that supplies a certain motor is specified previously, and a motor drive unit that receives feedback information from the motor is also specified beforehand.

However, when a machine includes multiple motor drive units and multiple motors, there occur cases where the power lines and the feedback lines are erroneously connected due to human error. In such a case, it is difficult or impossible to control the motors properly, so that the machine driven by the motors goes out of control, which in turn increases the risk of damage to the peripheral equipment and personal injury due to the runaway machine.

Japanese Laid-Open Patent Publication No. 2016-001945 proposes a method in which, when a motor and a motor drive unit (amplifier) are connected to each other by multiple power lines and a single feedback line, the motor drive unit is adapted to detect erroneous wire connection during feedback control. However, the disclosed method does not take into consideration a configuration in which multiple motors and multiple motor drive units are connected by multiple power lines and multiple feedback lines.

It is therefore an object of the present invention to provide a control device and a wire connection determination method which facilitate detection of erroneous wire connection when a plurality of motors and a plurality of motor drive units are connected using multiple power lines and multiple feedback lines.

One aspect of the present invention resides in a control device that controls a plurality of motors installed in a machine tool or an industrial machine through a plurality of motor drive units, wherein: the plurality of motor drive units are connected to the plurality of motors by multiple power lines and multiple feedback lines; the motor drive unit supplies the motor with electric power according to a drive command from the control device, through the power line; and the motor transmits feedback information corresponding to current positional information, to the motor drive unit through the feedback line. The control device includes: an output unit configured to select at least one of the plurality of motors and output the drive command to the motor drive unit that should be connected to the selected motor so that the selected motor executes a predetermined feed operation; an acquisition unit configured to acquire the feedback information from each of the plurality of motor drive units; and a wire connection determination unit configured to determine, based on the feedback information, whether the selected motor is connected to the motor drive unit that should be connected to the selected motor, by the power line and the feedback line according to a prescribed connection relationship.

Another aspect of the present invention resides in a wire connection determination method in which a plurality of motor drive units and a plurality of motors installed in a machine tool or an industrial machine are connected to each other by multiple power lines and multiple feedback lines, the motor drive unit supplies the motor with electric power according to a drive command, through the power line, and when the motor transmits feedback information corresponding to current positional information, to the motor drive unit through the feedback line, it is determined whether the multiple power lines and the multiple feedback lines are connected according to a prescribed connection relationship. The wire connection determination method includes: a selecting step of selecting at least one of the plurality of motors; an output step of outputting the drive command to the motor drive unit that should be connected to the selected motor so that the selected motor executes a predetermined feed operation; an acquisition step of acquiring the feedback information from each of the plurality of motor drive units; and a wire connection determination step of determining, based on the feedback information, whether the selected motor is connected to the motor drive unit that should be connected to the selected motor, by the power line and the feedback line.

According to the present invention, it is possible to provide a control device and a wire connection determination method which are capable of detecting erroneous wire connection when a plurality of motors and a plurality of motor drive units are connected using multiple power lines and multiple feedback lines.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Now, the present invention will be detailed by giving preferred embodiments with reference to the accompanying drawings.

Embodiment

Figure 1:
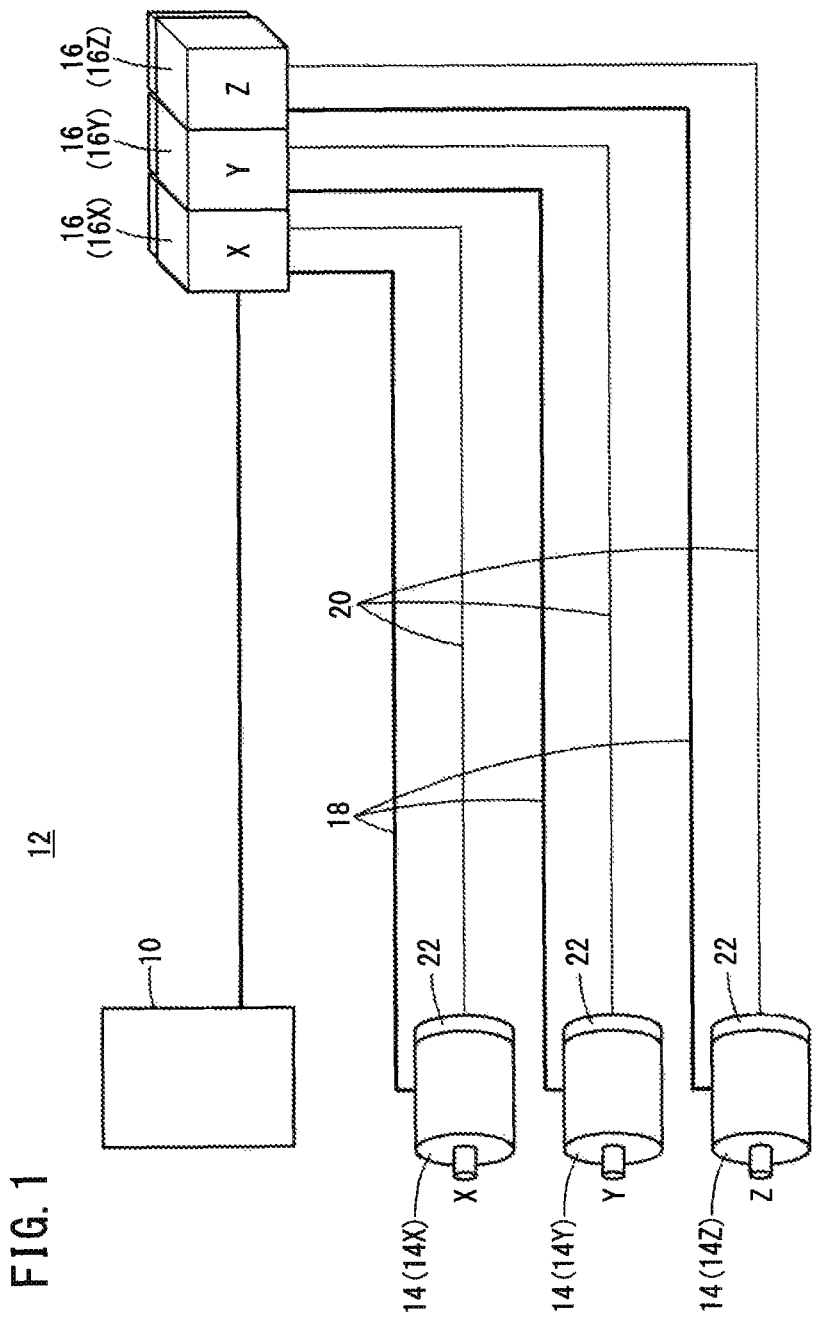
FIG. 1 is an overall configuration diagram of a system including a control device according to an embodiment.

FIG. 1 is an overall configuration diagram showing a system 12 including a control device 10 of the embodiment.

The system 12 of the present embodiment includes motors 14, motor drive units 16, power lines 18 and feedback lines 20 that connect the motors 14 and the motor drive units 16, and a control device 10 connected to the motor drive units 16. Hereinbelow, these will be described in detail.

The motors 14 are servomotors belonging to a machine tool or an industrial machine. In a specific example, the motors 14 are provided in a large-scale press machine installed in a factory. The motors 14 perform rotating operation (feed operation) according to electric power supplied from the motor drive units 16.

Each motor 14 includes a detector 22. The detector 22 of the present embodiment is an encoder that detects the rotation angle (current positional information) of the motor 14 when the motor 14 rotates. In this embodiment, the rotation angle of the motor 14 detected by the detector 22 is also referred to as "feedback information".

The current positional information detected as "feedback information" by the detector 22 is a rotation angle as mentioned above in this embodiment, but the rotation speed or the rotation position of the motor 14 may be detected as the current positional information. That is, the current positional information in the present embodiment refers to a physical quantity that is detected from the motor 14 based on the feed operation of the motor 14 performed according to supplied electric power.

There are multiple motors 14. In this embodiment, there are three motors 14. However, the number of the motors 14 is not limited to this. For uniquely identifying each motor, the three motors 14 are referred to as "motor 14X", "motor 14Y", and "motor 14Z".

The motor drive unit 16 of this embodiment is a servo amplifier that supplies electric power to the motor 14. There are multiple motor drive units 16, which are provided at least as many as the motors 14. In this embodiment, three motor drive units 16, as many as the number of the motors 14, are provided, and in order to distinguish from each other, they are referred to as "motor drive unit 16X", "motor drive unit 16Y", and "motor drive unit 16Z".

Electric power is supplied from the motor drive unit 16 to the motor 14 via the power line 18 that connects the motor drive unit 16 and the motor 14. The total number of power lines 18 is the same as that of the motor drive units 16 ("3" in this embodiment).

The motor 14 and the motor drive unit 16 are also connected by a line (cable) referred to as "feedback line 20" in the embodiment. The feedback line 20 is a line that transmits the feedback information from the detector 22 of the motor 14 to the motor drive unit 16. The number of the feedback lines 20 is the same as that of the motor 14 ("3" in this embodiment).

The connection relationship between the motors 14 and the motor drive units 16 to be connected by the power lines 18 and the feedback lines 20 is specified beforehand. This connection relationship will be also referred to as "prescribed connection relationship". In the present embodiment, the "prescribed connection relationship" is assumed as shown in FIG. 1. That is, in the present embodiment, it is specified beforehand that the motor 14X and the motor drive unit 16X are connected to each other by the power line 18 and the feedback line 20. Similarly, in the present embodiment, it is specified beforehand that the motor 14Y and the motor drive unit 16Y are connected to each other by the power line 18 and the feedback line 20. Further, in the present embodiment, it is specified beforehand that the motor 14Z and the motor drive unit 16Z are connected to each other by the power line 18 and the feedback line 20.

Figure 2:
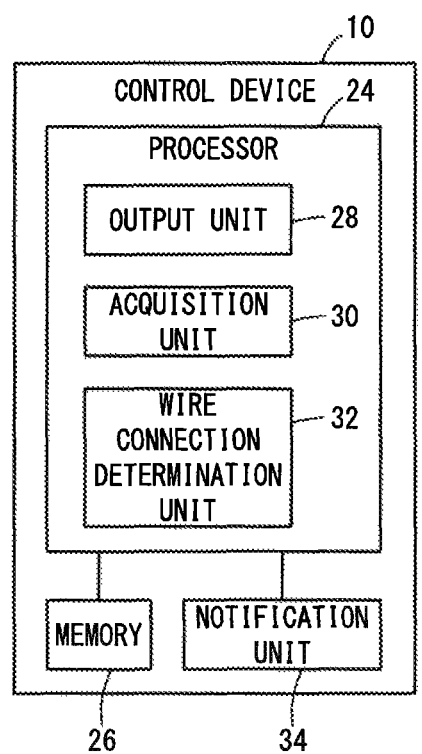
FIG. 2 is a schematic configuration diagram of the control device according to the embodiment.

FIG. 2 is a schematic configuration diagram of the control device 10 of the embodiment.

The control device 10 is a device that is connected to the multiple motor drive units 16 and controls the multiple motors 14 through the multiple motor drive units 16. The control device 10 includes a processor 24 and a memory 26. Thus, the control device 10 has arithmetic processing functions including execution of programs.

The memory 26 stores predetermined programs for controlling the motors 14 and the aforementioned prescribed connection relationship.

The processor 24 runs a predetermined program stored in the memory 26 to control the motors 14. The processor 24 includes an output unit 28, an acquisition unit 30, and a wire connection determination unit 32, which will be described sequentially.

The output unit 28 outputs a command for rotating a motor 14, to the motor drive unit 16 that should be connected to the motor 14. In this embodiment, this command will be also referred to as "drive command".

The drive command contains designation of parameters relating to the rotation to be executed by the motor 14. This "parameter" is a physical quantity such as, for example, the rotation speed, the rotation angle, and rotational position when the motor 14 rotates. In this embodiment, the drive command at least includes the designation of the rotation angle. On a drive command being inputted, the motor drive unit 16 supplies electric power according to the drive command, to the motor 14 connected to the motor drive unit itself, via the power line 18.

"The motor drive unit 16 that should be connected to the motor 14" is determined based on the connection relationship stored in the memory 26. In the present embodiment, for example, suppose that the control device 10 is caused to control the motor 14X. In this case, the motor drive unit 16 that should be connected to the motor 14X by the power line 18 must be the motor drive unit 16X. Therefore, the output unit 28 outputs a drive command to the motor drive unit 16X. Similarly, when the motor 14Y and the motor 14Z are desired to be controlled, the output unit 28 outputs a command respectively to the motor drive units 16Y and 16Z.

The acquisition unit 30 acquires feedback information from each of the multiple motor drive units 16. The control device 10 of this embodiment acquires feedback information from all of the multiple motor drive units 16 connected to the control device itself.

Thus, the control device 10 can grasp the actual rotating operations of the motors 14 to which drive commands were output. Then, the control device 10, based on the acquired feedback information, outputs additional drive commands to the multiple motor drive units 16 so that each motor 14 will operate to rotate appropriately. The control method for controlling a control target based on the feedback information detected from the control target in the above way is called "feedback control".

In the case of the present embodiment, the control device 10 grasps the actual rotating operation of the motor 14X based on the feedback information from the motor drive unit 16X. Grasping the rotating operation based on the feedback information can be achieved by the processor 24 analyzing the feedback information. Similarly, the control device 10 grasps the actual rotating operation of the motor 14Y based on the feedback information from the motor drive unit 16Y, and grasps the actual rotating operation of the motor 14Z based on the feedback information from the motor drive unit 16Z.

The wire connection determination unit 32 determines whether each motor 14 is correctly connected to the motor drive unit 16 that should be connected to the motor 14 by the power line 18 and the feedback line 20. The flow of processing (wire connection determination method) from start to completion of this determination by the wire connection determination unit 32 will be described by giving a specific example.

Figure 3:
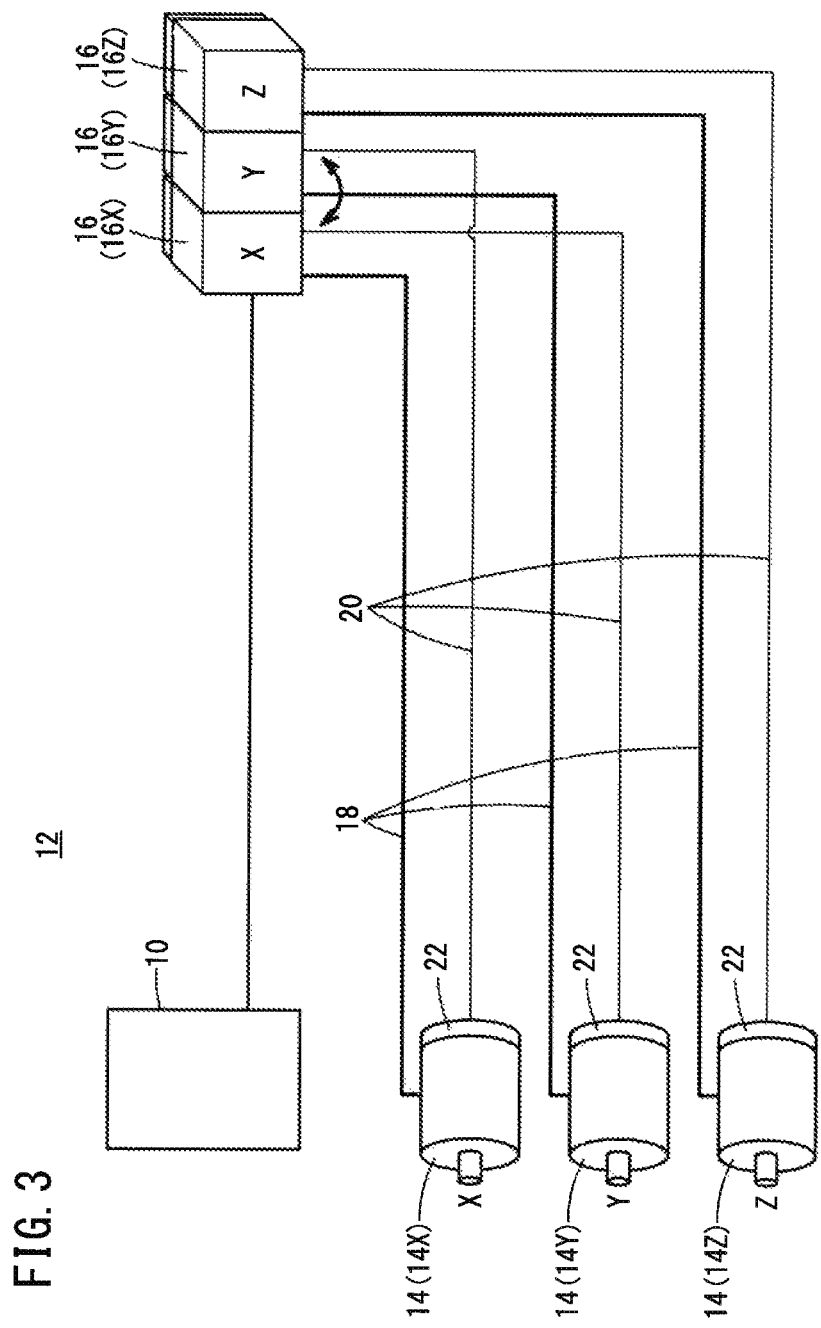
FIG. 3 is a diagram showing an example where an erroneous wire connection occurs in the system of FIG. 1.
Figure 4:
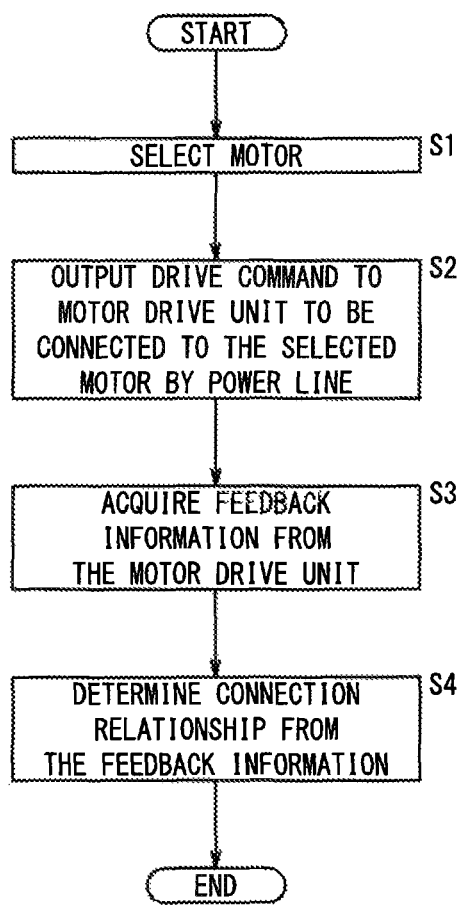
FIG. 4 is a flowchart showing a processing flow example of a wire connection determination method performed by the control device.

FIG. 3 shows one example where erroneous wire connection occurs in the system 12 of FIG. 1. FIG. 4 is a flow chart showing one flow example of the wire connection determination method implemented by the control device 10.

For example, suppose that that the connection relationship stored in the memory 26 is as shown in FIG. 1, but the system 12 has the actual connection relationship shown in FIG. 3. In FIG. 3, the motor 14X and the motor drive unit 16Y are connected to each other by the feedback line 20, and similarly, the motor 14Y and the motor drive unit 16X are connected to each other by the feedback line 20.

First, the output unit 28 selects at least one motor 14 from the multiple motors 14 (step S1). Step S1 starts when an operator that tries to check the wire connection state instructs the control device 10 to run a "wire connection determination program". The "wire connection determination program" is a program that causes the control device 10 to execute the wire connection determination method of FIG. 4, and is stored in the memory 26.

At step S1, the output unit 28 may allow the operator to select one motor 14. In this embodiment, it is assumed that the operator selects the motor 14X.

Next, the output unit 28 outputs a drive command only to the motor drive unit 16 that should be connected to the selected motor 14 so that the selected motor 14 will perform a predetermined rotating operation (step S2). The motor drive unit 16 to be the output destination is determined based on the connection relationship stored in the memory 26 as described above. In the present embodiment, the motor 14X is selected at step S1. Therefore, the drive command is output to the motor drive unit 16X at step S2.

Next, the acquisition unit 30 acquires feedback information from each of the multiple motor drive units 16 (step S3). Step S3 is continuously executed for a predetermined period after completion of step S2.

Then, the wire connection determination unit 32 determines whether the motor 14 selected by the output unit 28 and the motor drive unit 16 to be connected to the selected motor 14 are connected by the power line 18 and the feedback line 20 (step S4).

The determination made by the wire connection determination unit 32 is performed based on the feedback information the acquisition unit 30 acquired at step S3. The wire connection determination unit 32 of this embodiment determines whether or not the drive command and the feedback information actually acquired from the motor drive unit 16X fall within the range of a permissible error. Here, the rotation angle designated by the drive command is compared with the rotation angle indicated by the feedback information. The range of the "permissible error" may be changed as appropriate by the operator who manages the control device 10.

In the case of FIG. 3, what is acquired from the motor drive unit 16X is feedback information on the motor 14Y that is not rotating. Therefore, the acquisition unit 30 acquires, from the motor drive unit 16X, feedback information indicative of a rotation angle that is completely different from the drive command (i.e., indicative of no rotation). If the result of comparing the drive command and the feedback information does not fall within the range of the permissible error, then the wire connection determination unit 32 determines that the motor 14X and the motor drive unit 16X are not connected according to the connection relationship stored in the memory 26.

Thus, the control device 10 can easily determine whether or not the selected motor 14 and the motor drive unit 16 to be connected to the selected motor 14 are connected correctly by the power line 18 and the feedback line 20.

The control device 10 further includes a notification unit 34 (FIG. 2). The notification unit 34 is, for example, a speaker that emits a sound, or a display screen that displays a message. The notification unit 34 gives a notice of the result of determination by the wire connection determination unit 32, to the operator residing nearby.

In this case, it is preferable that the control device 10 does not perform feedback control based on the feedback information obtained at step S3. Not performing feedback control based on the feedback information obtained at step S3, makes it possible to prevent the risk of the motor 14 going out of control which would occur if erroneous wire connection is not corrected.

Though, in the above, the execution of the wire connection determination program is instructed by the operator, the wire connection determination program may be executed at a predetermined timing (e.g., at the operation start time every morning in the factory).

Modified Examples

Though the above embodiment has been described as one example of the present invention, it goes without saying that various modifications and improvements can be added to the above embodiment. It is also apparent from the scope of claims that the embodiment added with such modifications and improvements should be incorporated in the technical scope of the invention.

Modified Example 1

In the above embodiment, the operator selects a motor 14 at step S1. However, the control device 10 may be configured to cause the output unit 28 to select multiple motors 14 in turn and automatically repeat the above steps S1 to S4. For example, the control device 10 first selects the motor 14X at step S1 and executes steps S2 to S4. Next, the control device 10 selects the motor 14Y at step S1 and executes steps S2 to S4. Then, the control device 10 selects the motor 14Z at step S1 and executes steps S2 to S4.

With this configuration, the control device 10 can easily determine whether or not each of the multiple motors 14 and the motor drive unit 16 to be connected thereto are properly connected by the power line 18 and the feedback line 20.

Modified Example 2

The output unit 28 may select multiple motors 14 at step S1. In this case, the output unit 28 outputs a drive command to each of the multiple motor drive units 16 to be connected respectively to the selected motors 14 so as to cause the selected multiple motors 14 to perform predetermined rotational operations different from each other. At this time, the output unit 28 may output the drive commands simultaneously to the multiple motor drive units 16.

Since the drive commands causing the selected multiple motors 14 to perform rotational operations different from each other are output, the rotational operation indicated by the feedback information obtained from each of the multiple motor drive units 16 becomes different from one another.

Then, the wire connection determination unit 32 may determine whether or not the selected multiple motors 14 are properly connected respectively to the multiple motor drive units 16 that should be connected to the respective selected multiple motors 14, by the power line 18 and the feedback line 20. At this time, the wire connection determination unit 32 can recognize which one of the drive commands outputted to the multiple motor drive units 16 each feedback information corresponds to, based on the content of each feedback information.

This makes it possible to easily and efficiently determine whether or not the selected multiple motors 14 are correctly connected respectively to the multiple motor drive units 16 that should be connected to the respective selected motors 14, by the power line 18 and the feedback line 20.

Modified Example 3

Figure 5:
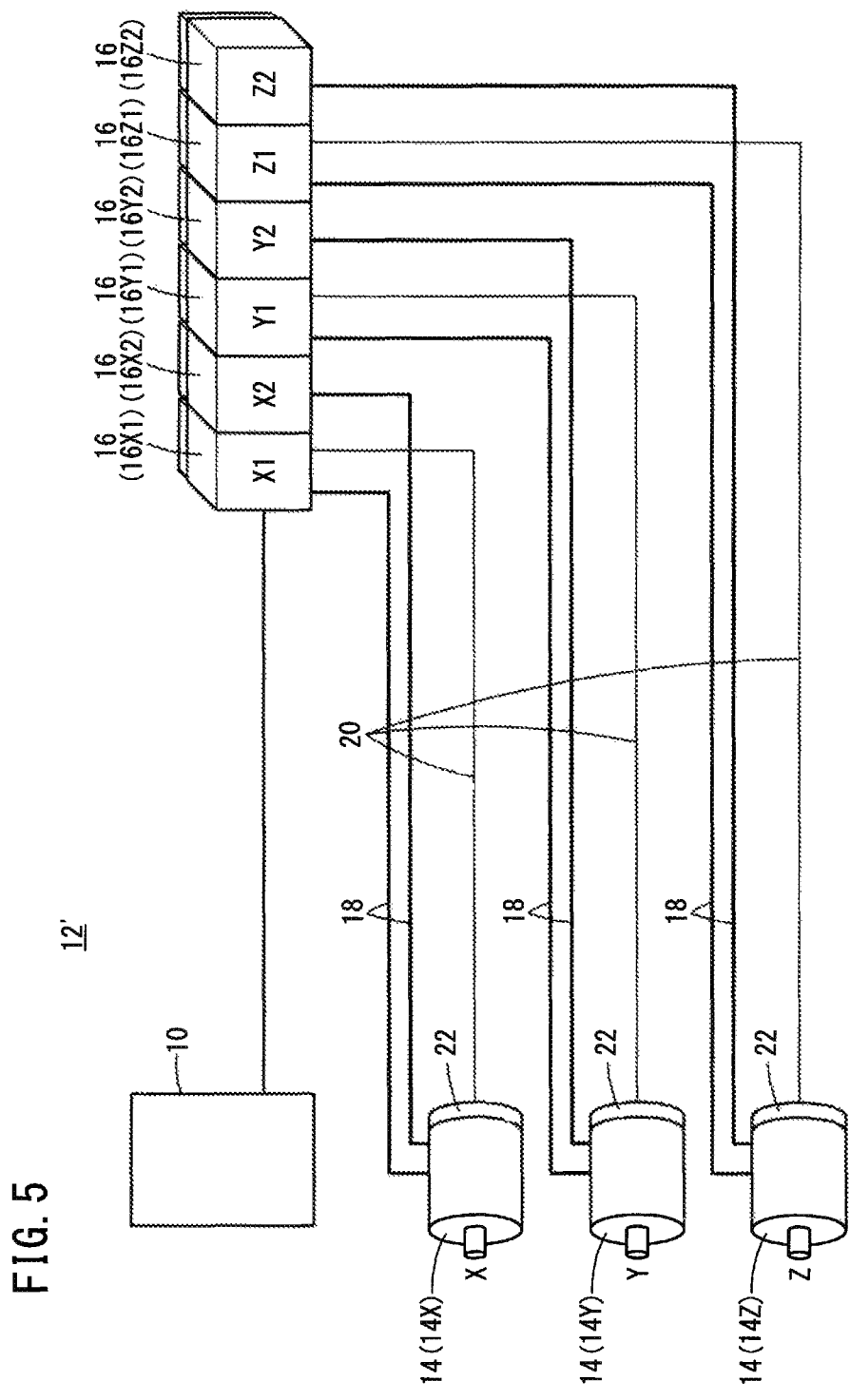
FIG. 5 is an overall configuration diagram of a system of a modified example 3.

FIG. 5 is an overall configuration diagram showing a system 12' according to a modified example 3.

In the system 12', two motor drive units 16 are connected to each motor 14 by power lines 18. Hereinafter, for distinguish the motor drive units from each other, the motor drive units 16 to be connected to the motor 14X by power lines 18 are also referred to as "motor drive unit 16X1" and "motor drive unit 16X2". Similarly, the motor drive units 16 to be connected to the motor 14Y by the power lines 18 are also referred to as "motor drive unit 16Y1" and "motor drive unit 16Y2". Further, the motor drive units 16 to be connected to the motor 14Z by power lines 18 are also referred to as "motor drive unit 16Z1" and "motor drive unit 16Z2".

In the system 12', not only the feedback information corresponding to the drive command output to the motor drive unit 16X1, but also the feedback information corresponding to the drive command output to the motor drive unit 16X2 are transmitted to the motor drive unit 16X1. Therefore, of the motor drive units 16X1 and 16X2, the motor drive unit 16X1 is connected to the motor 14X by a feedback line 20. Similarly, the motor drive units 16Y1 and 16Z1 are connected respectively to the motors 14Y and 14Z by feedback lines 20.

In the system 12', the output unit 28 may select multiple motors 14, which each should be connected to multiple motor drive units 16 by power lines 18. Further, the output unit 28 may sequentially output drive commands that instruct the motors 14 to perform predetermined rotational operations different from each other, to the multiple motor drive units 16 that should be connected to the selected motors 14.

Figure 6:
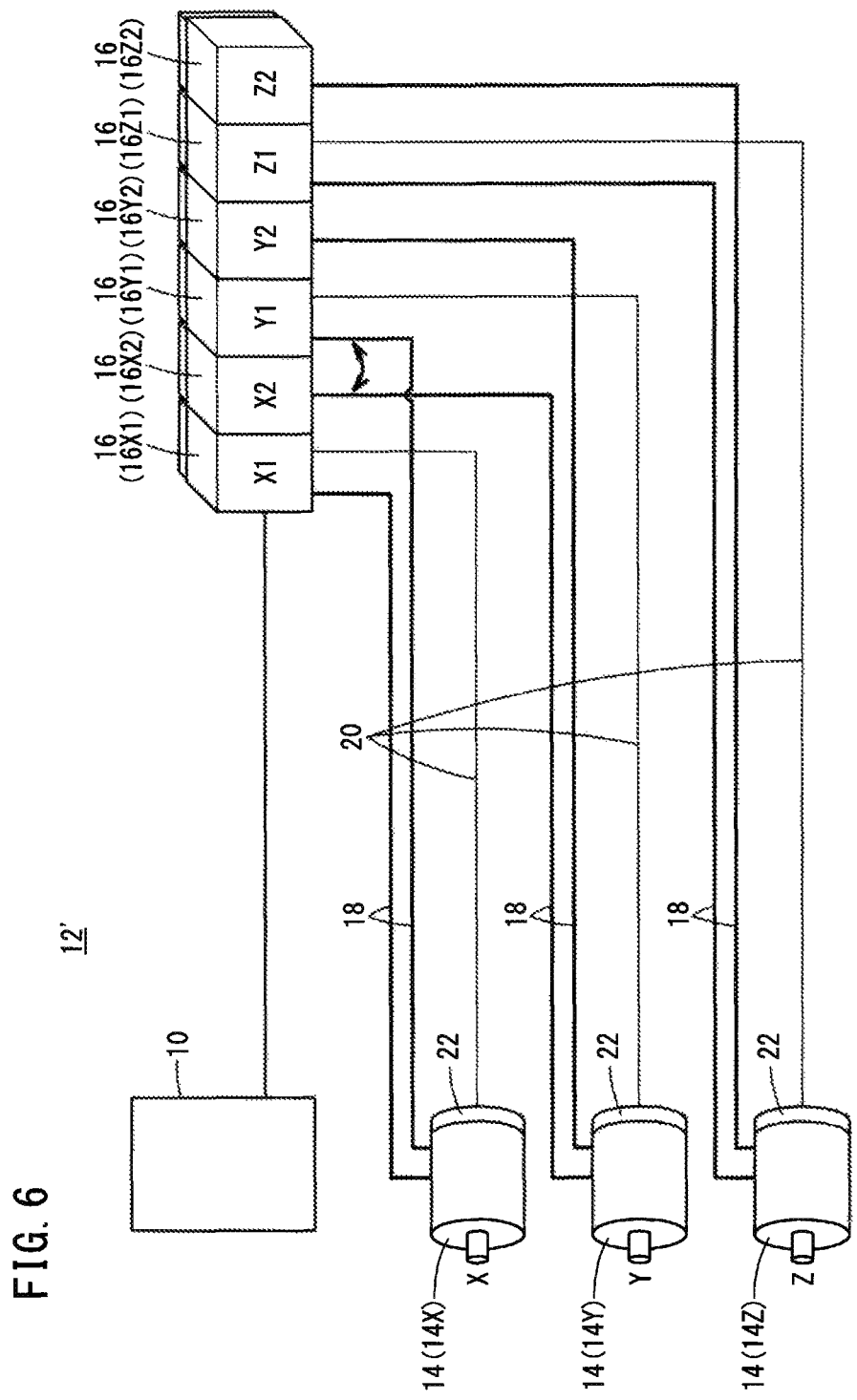
FIG. 6 is a diagram showing an example where an erroneous wire connection occurs in the system of FIG. 5.

FIG. 6 is an example of a case where erroneous wire connection occurs in the system 12' of the modified example 3.

For example, in FIG. 6, the power line 18 to be connected to the motor drive unit 16X2 and the power line 18 to be connected to the motor drive unit 16Y1 are erroneously exchanged with each other. In this case, if drive commands of the same content are output to the motor drive units 16X2 and 16Y1, the feedback information obtained from each of the units indicates the same rotational operation content.

To avoid this situation, in the present embodiment, as described above, the output unit 28 is configured to output drive commands that instruct the motors 14 to perform predetermined rotational operations different from each other, to the multiple motor drive units 16 to be connected to the selected motors 14. Thus, it is possible to identify which one of the drive commands outputted to the multiple motor drive units 16 each of the feedback information obtained from the motor drive units 16X2 and 16Y1 corresponds to.

Accordingly, even if multiple motors 14 that should be connected to multiple motor drive units 16 by power lines 18 are selected, it is possible to easily determine whether an erroneous wire connection is present in the system 12'.

It should be noted that, in this modified example, the number of the multiple motor drive units 16 to be connected to a single motor 14 is not limited to "2".

Further, in this modified example, the motor drive unit 16 to be connected to the motor 14X by the feedback line 20 in the system 12' may be changed from the motor drive unit 16X1 by appropriately changing the prescribed connection relationship.

Modified Example 4

Figure 7:
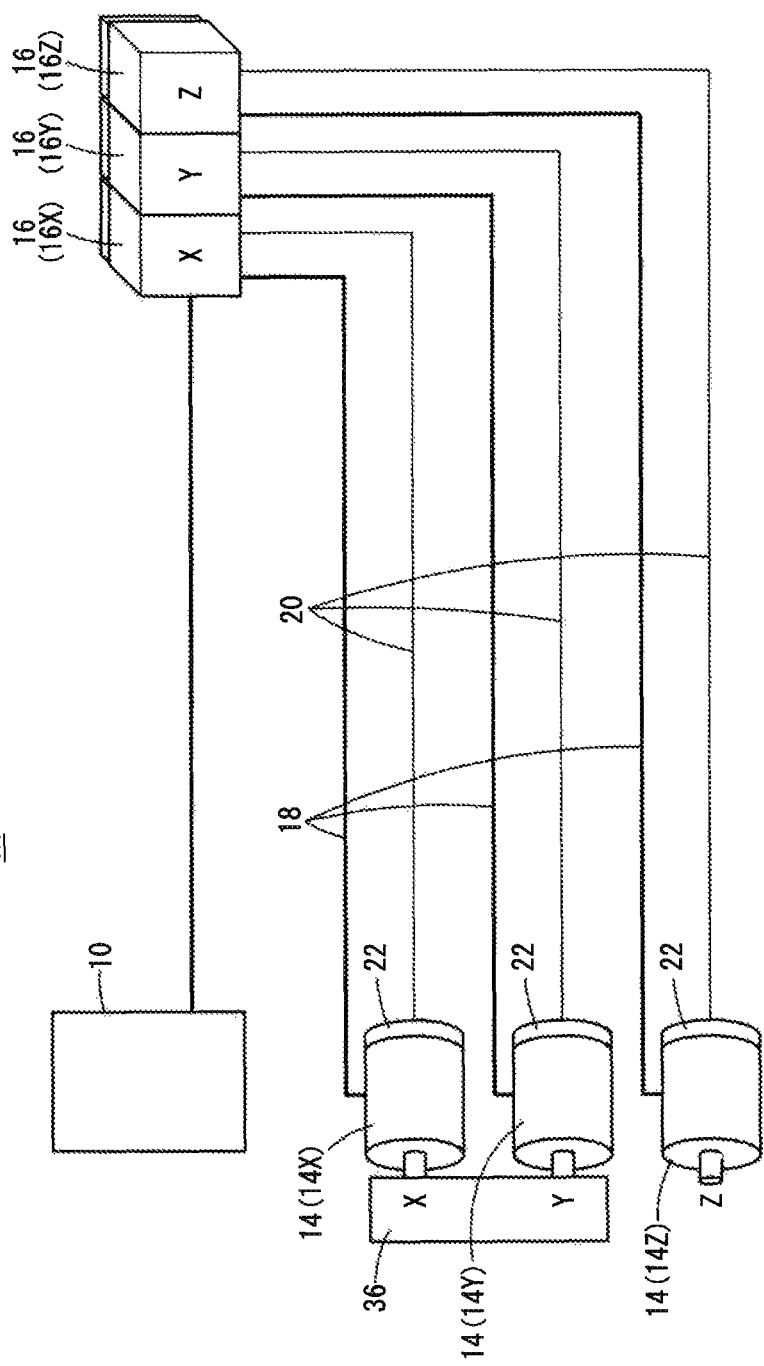
FIG. 7 is an overall configuration diagram of a system of a modified example 4.

FIG. 7 is an overall configuration diagram of a system 12" of a modified example 4.

The wire connection determination unit 32 may determine, from the feedback information acquired earliest after outputting of a drive command, whether a selected motor 14 and a motor drive unit 16 that should be connected to that motor 14 are connected by the power line 18 and the feedback line 20.

In the system 12" in FIG. 7, the motor 14X and the motor 14Y are coupled with each other by a coupling member 36. In this case, the motor 14X and motor 14Y operate along with each other. That is, as the motor 14X rotates by being supplied with electric power, the motor 14Y rotates together with the motor 14X without supply of electric power. As a result, the acquisition unit 30 obtains the feedback information indicative of the rotational operation corresponding to the drive command, not only from the motor drive unit 16X but also from the motor drive unit 16Y.

Figure 8:
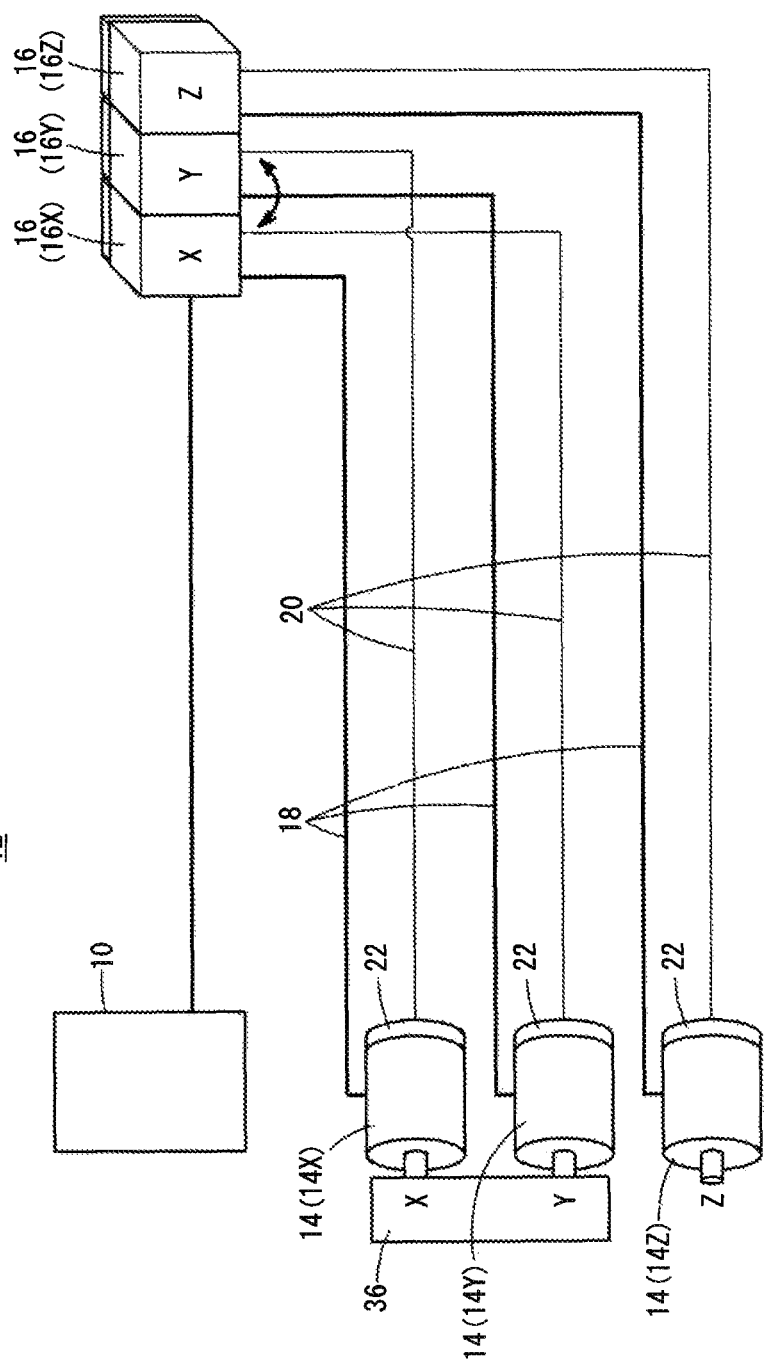
FIG. 8 is a diagram showing an example where an erroneous wire connection occurs in the system of FIG. 7.

FIG. 8 is an example of a case where erroneous wire connection is present in the system 12" of the modified example 4.

For example, in FIG. 8, the feedback lines 20 to be connected to the motor drive units 16X and 16Y are erroneously connected so as to replace each other. In this case, if the motor 14X is selected and a drive command is output to the motor drive unit 16, then the feedback information indicating the content that corresponds to the drive command is obtained from the motor drive unit 16X without a hitch. This is because the motor 14Y which is wrongly connected to the motor drive unit 16X by the feedback line 20 operate along with the motor 14X.

To deal with this situation, the wire connection determination unit 32 of this modified example executes step S4 based on the feedback information acquired earliest after outputting of a drive command, as stated above, while the feedback information acquired second or afterwards is ignored. This is because the motor 14 that is connected, by the power line 18, to the motor drive unit 16 to which the drive command is output starts to rotate earliest even when multiple motors 14 are coupled with each other. Here, "the feedback information acquired earliest" refers to "the earliest-acquired feedback information of the feedback information indicating that the motor 14 has started to rotate".

Thus, even when multiple motors 14 are coupled so as to operate along with each other, it is possible to easily determine whether a selected motor 14 and the motor drive unit 16 that should be connected to the motor 14 are correctly connected by the power line 18 and the feedback line 20.

Modified Example 5

In the description of the embodiment, a servomotor is used as the motor 14. However, the motor 14 is not limited to this, and a linear motor can also be used. A linear motor produces linear movement as a feed operation. In addition, the content included in the feedback information (current positional information detected by the detector 22 of the motor 14) may be changed accordingly. As an example, the current positional information when the motor 14 is a linear motor may be, for example, the amount of movement when the motor 14 performs a feed operation (linear movement).

Modified Example 6

The above embodiment and the modified examples may be appropriately combined as long as no contradiction occurs.

[Inventions Obtained from the Embodiment]

Inventions that can be grasped from the above-described embodiment and modified examples will be described below.

<First Invention>

The first invention is a control device (10) that controls a plurality of motors (14) installed in a machine tool or an industrial machine through a plurality of motor drive units (16), wherein: the plurality of motor drive units (16) are connected to the plurality of motors (14) by multiple power lines (18) and multiple feedback lines (20); the motor drive unit (16) supplies the motor (14) with electric power according to a drive command from the control device (10), through the power line (18); and the motor (14) transmits feedback information corresponding to current positional information, to the motor drive unit (16) through the feedback line (20). The control device (10) includes: an output unit (28) configured to select at least one of the plurality of motors (14) and output the drive command to the motor drive unit (16) that should be connected to the selected motor (14) so that the selected motor (14) executes a predetermined feed operation; an acquisition unit (30) configured to acquire the feedback information from each of the plurality of motor drive units (16); and a wire connection determination unit (32) configured to determine, based on the feedback information, whether the selected motor (14) is connected to the motor drive unit (16) that should be connected to the selected motor (14), by the power line (18) and the feedback line (20) according to a prescribed connection relationship.

Thus, it is possible to provide a control device (10) capable of easily detecting erroneous wire connection when a plurality of motors (14) and a plurality of motor drive units (16) are connected using multiple power lines (18) and multiple feedback lines (20).

The output unit (28) may be configured to select each one of the plurality of motors (14), in turn. Thus, it is possible to easily determine, for each of the plurality of motors (14), whether or not the motor drive unit (16) to be connected is properly connected by the power line (18) and the feedback line (20).

The output unit (28) may be configured to select multiple motors from among the motors (14) and output the drive commands respectively to multiple motor drive units (16), among the drive units, that should be connected to the selected multiple motors (14), so that the selected multiple motors (14) execute predetermined feed operations different from each other, and the wire connection determination unit (32) may be configured to determine, based on the feedback information, whether the selected multiple motors (14) are connected to the multiple motor drive units (16) that should be connected to the selected multiple motors (14), by the power lines (18) and the feedback lines (20). Herein, the drive commands to the multiple motor drive units (16) may be output at the same time. With this configuration, it is possible to easily and efficiently determine whether or not each of the selected multiple motors (14) is connected to the corresponding one of the multiple motor drive units (16) that should be connected respectively to the selected multiple motors (14), by the power line (18) and the feedback line (20).

The output unit (28) may be configured to, when selecting the multiple motors (14) that should be connected to the multiple motor drive units (16) by the power lines (18), sequentially output the drive commands that instruct the selected multiple motors (14) to execute predetermined feed operations different from each other, respectively to the multiple motor drive units (16) that should be connected to the selected multiple motors (14). Owing thereto, even if multiple motors (14) to be connected to multiple motor drive units (16) by the power lines (18) are selected, it is possible to easily determine whether or not an erroneous wire connection is taking place.

The wire connection determination unit (32) may be configured to determine, based on the feedback information acquired earliest after outputting of the drive command, whether the selected motor (14) and the motor drive unit (16) that should be connected to the selected motor (14) are connected to each other by the power line (18) and the feedback line (20). Here, "the feedback information acquired earliest" may indicate "the earliest-acquired feedback information among the feedback information indicating that the motor (14) has started to rotate". With this configuration, even when the selected multiple motors (14) are interlocked for instance, it is possible to easily determine whether or not an erroneous wire connection is taking place.

The wire connection determination unit (32) may be configured to determine, based on comparison between the drive command and the feedback information, whether the multiple power lines (18) and the multiple feedback lines (20) are connected according to the prescribed connection relationship. Thus, it is possible to easily detect erroneous wire connection of multiple power lines (18) and multiple feedback lines (20) by which multiple motors (14) and multiple motor drive units (16) are connected.

The control device (10) may further include a notification unit (34) configured to give notice of a result of determination made by the wire connection determination unit (32). Thus, it is possible to notify the operator residing nearby of the result of determination made by the wire connection determination unit (32).

<Second Invention>

The second invention is a wire connection determination method in which a plurality of motor drive units (16) and a plurality of motors (14) installed in a machine tool or an industrial machine are connected to each other by multiple power lines (18) and multiple feedback lines (20), the motor drive unit (16) supplies the motor (14) with electric power according to a drive command, through the power line (18), and when the motor (14) transmits feedback information corresponding to current positional information, to the motor drive unit (16) through the feedback line (20), it is determined whether the multiple power lines (18) and the multiple feedback lines (20) are connected according to a prescribed connection relationship. The wire connection determination method, includes: a selecting step of selecting at least one of the plurality of motors (14); an output step of outputting the drive command to the motor drive unit (16) that should be connected to the selected motor (14) so that the selected motor (14) executes a predetermined feed operation; an acquisition step of acquiring the feedback information from each of the plurality of motor drive units (16); and a wire connection determination step of determining, based on the feedback information, whether the selected motor (14) is connected to the motor drive unit (16) that should be connected to the selected motor (14), by the power line (18) and the feedback line (20).

Thus, it is possible to provide a wire connection determination method capable of easily detecting erroneous wire connection when a plurality of motors (14) and a plurality of motor drive units (16) are connected using multiple power lines (18) and multiple feedback lines (20).

The selecting step may select multiple motors from among the motors (14); the output step may output the drive commands respectively to multiple motor drive units (16), among the motor drive units, that should be connected to the multiple motors (14) selected at the selecting step, so that the selected multiple motors (14) execute predetermined feed operations different from each other; and the wire connection determination step determines, based on the feedback information, whether the selected multiple motors (14) are connected to the multiple motor drive units (16) that should be connected to the selected multiple motors (14), by the power lines (18) and the feedback lines (20). Herein, the drive commands to the multiple motor drive units (16) may be output at the same time. With this configuration, it is possible to easily and efficiently determine whether or not each of the selected multiple motors (14) is connected to the corresponding one of the multiple motor drive units (16) to be connected respectively to the selected multiple motors (14), by the power line (18) and the feedback line (20).

When the selecting step selects the multiple motors (14) that should be connected to the multiple motor drive units (16), the output step may output the drive command that instructs each of the selected multiple motors (14) to execute a predetermined feed operation different from each other, to each one of the multiple motor drive units (16) that should be connected to the selected multiple motors (14). Thus, even if multiple motors (14) to be connected to multiple motor drive units (16) by the power lines (18) are selected, it is possible to easily determine whether or not erroneous wire connection is taking place.

The wire connection determination step may determine, based on the feedback information acquired earliest after outputting of the drive command, whether the selected motor (14) and the motor drive unit (16) that should be connected to the selected motor (14) are connected to each other by the power line (18) and the feedback line (20). Here, "the feedback information acquired earliest" may indicate "the earliest-acquired feedback information among the feedback information indicating that the motor (14) has started to rotate". With this configuration, even when the selected multiple motors (14) are interlocked for instance, it is possible to easily determine whether or not erroneous wire connection is taking place.

The wire connection determination step may determine, based on comparison between the drive command and the feedback information, whether the multiple power lines (18) and the multiple feedback lines (20) are connected in the prescribed connection relationship. Thus, it is possible to easily detect erroneous wire connection of multiple power lines (18) and multiple feedback lines (20) by which multiple motors (14) and multiple motor drive units (16) are connected.

The wire connection determination method may further include a notifying step of giving notice of a result of determination made at the wire connection determination step. Thus, it is possible to notify the operator residing nearby of the result of determination made at the wire connection determination step.

What is claimed is:

1. A control device that controls a plurality of motors installed in a machine tool or an industrial machine through a plurality of motor drive units, wherein:
   the plurality of motor drive units are connected to the plurality of motors by multiple power lines and multiple feedback lines;
   the motor drive unit supplies the motor with electric power according to a drive command from the control device, through the power line; and
   the motor transmits feedback information corresponding to current positional information, to the motor drive unit through the feedback line,
   the control device comprising:
   an output unit configured to select at least one of the plurality of motors and output the drive command to the motor drive unit that should be connected to the selected motor so that the selected motor executes a predetermined feed operation;
   an acquisition unit configured to acquire the feedback information from each of the plurality of motor drive units; and
   a wire connection determination unit configured to determine, based on the feedback information, whether the selected motor is connected to the motor drive unit that should be connected to the selected motor, by the power line and the feedback line according to a prescribed connection relationship.

2. The control device according to claim 1, wherein the output unit is configured to select each one of the plurality of motors, in turn.

3. The control device according to claim 1, wherein:
   the output unit is configured to select multiple motors from among the motors and output the drive commands respectively to multiple motor drive units, among the motor drive units, that should be connected to the selected multiple motors, so that the selected multiple motors execute predetermined feed operations different from each other; and the wire connection determination unit is configured to determine, based on the feedback information, whether the selected multiple motors are connected to the multiple motor drive units that should be connected to the selected multiple motors, by the power lines and the feedback lines.

4. The control device according to claim 3, wherein the output unit is configured to, when selecting the multiple motors that should be connected to the multiple motor drive units by the power lines, sequentially output the drive commands that instruct the selected multiple motors to execute predetermined feed operations different from each other, respectively to the multiple motor drive units that should be connected to the selected multiple motors.

5. The control device according to claim 1, wherein the wire connection determination unit is configured to determine, based on the feedback information acquired earliest after outputting of the drive command, whether the selected motor and the motor drive unit that should be connected to the selected motor are connected to each other by the power line and the feedback line.

6. The control device according to claim 1, wherein the wire connection determination unit is configured to determine, based on comparison between the drive command and the feedback information, whether the multiple power lines and the multiple feedback lines are connected according to the prescribed connection relationship.

7. The control device according to claim 1, further comprising a notification unit configured to give notice of a result of determination made by the wire connection determination unit.

8. A wire connection determination method in which a plurality of motor drive units and a plurality of motors installed in a machine tool or an industrial machine are connected to each other by multiple power lines and multiple feedback lines, the motor drive unit supplies the motor with electric power according to a drive command, through the power line, and when the motor transmits feedback information corresponding to current positional information, to the motor drive unit through the feedback line, it is determined whether the multiple power lines and the multiple feedback lines are connected according to a prescribed connection relationship, the wire connection determination method, comprising:

a selecting step of selecting at least one of the plurality of motors;

an output step of outputting the drive command to the motor drive unit that should be connected to the selected motor so that the selected motor executes a predetermined feed operation;

an acquisition step of acquiring the feedback information from each of the plurality of motor drive units; and a wire connection determination step of determining, based on the feedback information, whether the selected motor is connected to the motor drive unit that should be connected to the selected motor, by the power line and the feedback line.

9. The wire connection determination method according to claim 8, wherein:

the selecting step selects multiple motors from among the motors;

the output step outputs the drive commands respectively to multiple motor drive units, among the motor drive units, that should be connected to the multiple motors selected at the selecting step, so that the selected multiple motors execute predetermined feed operations different from each other; and the wire connection determination step determines, based on the feedback information, whether the selected multiple motors are connected to the multiple motor drive units that should be connected to the selected multiple motors, by the power lines and the feedback lines.

10. The wire connection determination method according to claim 9, wherein, when the selecting step selects the multiple motors that should be connected to the multiple motor drive units, the output step outputs the drive command that instructs each of the selected multiple motors to execute a predetermined feed operation different from each other, to each one of the multiple motor drive units that should be connected to the selected multiple motors.

11. The wire connection determination method according to claim 8, wherein the wire connection determination step determines, based on the feedback information acquired earliest after outputting of the drive command, whether the selected motor and the motor drive unit that should be connected to the selected motor are connected to each other by the power line and the feedback line.

12. The wire connection determination method according to claim 8, wherein the wire connection determination step determines, based on comparison between the drive command and the feedback information, whether the multiple power lines and the multiple feedback lines are connected in the prescribed connection relationship.

13. The wire connection determination method according to claim 8, further comprising a notifying step of giving notice of a result of determination made at the wire connection determination step.

* * * * *